United States Patent
Kim

(10) Patent No.: US 12,189,486 B2
(45) Date of Patent: Jan. 7, 2025

(54) DEVICE AND METHOD FOR MANAGING RECOVERY INFORMATION OF AUXILIARY STORAGE DEVICE

(71) Applicant: Deok Woo Kim, Seoul (KR)

(72) Inventor: Deok Woo Kim, Seoul (KR)

( * ) Notice: Subject to any disclaimer, the term of this patent is extended or adjusted under 35 U.S.C. 154(b) by 206 days.

(21) Appl. No.: 17/608,259

(22) PCT Filed: Apr. 21, 2020

(86) PCT No.: PCT/KR2020/005254
§ 371 (c)(1),
(2) Date: Nov. 2, 2021

(87) PCT Pub. No.: WO2020/222453
PCT Pub. Date: Nov. 5, 2020

(65) Prior Publication Data
US 2022/0206904 A1 Jun. 30, 2022

(30) Foreign Application Priority Data
May 2, 2019 (KR) .......................... 10-2019-0051807

(51) Int. Cl.
*G06F 11/00* (2006.01)
*G06F 11/14* (2006.01)

(52) U.S. Cl.
CPC ...... *G06F 11/1451* (2013.01); *G06F 11/1417* (2013.01); *G06F 11/142* (2013.01); *G06F 11/1458* (2013.01)

(58) Field of Classification Search
CPC . G06F 11/1451; G06F 11/1417; G06F 11/142
See application file for complete search history.

(56) References Cited

U.S. PATENT DOCUMENTS

2002/0099971 A1* 7/2002 Merkin ............... G06F 11/1417
714/E11.133
2003/0158831 A1* 8/2003 Zaremba ............. G06F 11/1448
(Continued)

FOREIGN PATENT DOCUMENTS

JP 2009-543199 A 12/2009
JP 2010-072740 A 4/2010
(Continued)

OTHER PUBLICATIONS

International Search Report for PCT/KR2020/005254 dated, Aug. 11, 2020 (PCT/ISA/210).

*Primary Examiner* — Craig S Goldschmidt
(74) *Attorney, Agent, or Firm* — Sughrue Mion, PLLC

(57) ABSTRACT

A device that can efficiently manage capacity of a backup auxiliary storage device in an auxiliary storage device and a method of managing backup auxiliary storage device are disclosed. The auxiliary storage device includes an original auxiliary storage device, a backup auxiliary storage device, and a user input device. A controller that controls these devices is disclosed. The backup auxiliary storage device stores recovery information about the original auxiliary storage device. The user input device receives a user input for switching between a normal mode and a backup mode. When in the normal mode, the controller controls the auxiliary storage device so that a host computer boots using an OS in the original auxiliary storage device and is not able to access the backup auxiliary storage device.

16 Claims, 5 Drawing Sheets

(56) References Cited

U.S. PATENT DOCUMENTS

2006/0112303 A1* 5/2006 Levy .................. G06F 11/1464
714/6.12
2011/0307657 A1* 12/2011 Timashev ........... G06F 11/1464
711/E12.001

FOREIGN PATENT DOCUMENTS

| JP | 2013-235470 A | 11/2013 |
| JP | 2017-167811 A | 9/2017 |
| JP | 2018-28715 A | 2/2018 |
| KR | 10-1920866 B1 | 11/2018 |
| KR | 10-1920867 B1 | 11/2018 |

* cited by examiner

DEVICE AND METHOD FOR MANAGING RECOVERY INFORMATION OF AUXILIARY STORAGE DEVICE

CROSS REFERENCE TO RELATED APPLICATIONS

This application is a national stage application of PCT/KR2020/005254 filed Apr. 21, 2020, which claims priority from Korean Patent Application No. 10-2019-0051807 filed May 2, 2019.

TECHNICAL FIELD

The present invention relates to an auxiliary storage device of a computer system and, more particularly, to a device and method for managing recovery information of an auxiliary storage device.

BACKGROUND ART

Recently, malicious code, such as ransomware, not only encrypts user files but also deletes partitions or folders that system recovery information is contained therein. Like this, when the entire system is controlled by one operating system (OS) as in the existing computer structure, malicious code, such as a hacking program or a computer virus, may take over the system with the authority of the top administrator. Then, it is not possible to prevent a change in the system configuration. Also, even when a malicious third party temporarily gains access and harms the system, it is not possible to cope with the situation.

To solve this problem, the present inventor has applied for and registered several inventions (Korean Patent Application No. 10-2017-0057998 and Korean Patent No. 10-1920866 and No. 10-1920867). These earlier inventions relate to an auxiliary storage device including an original auxiliary storage device and a backup auxiliary storage device. The original auxiliary storage device can be accessed anytime by a host computer, but access to the backup auxiliary storage device is limited such that a user can access the backup auxiliary storage device only under a specific condition (e.g., the condition of a recovery mode). Accordingly, using the earlier inventions makes safe backup and recovery possible. However, when information for backup is recorded every time the host computer accesses the auxiliary storage device, a backup auxiliary storage device with very large capacity is necessary. In particular, OS or application programs frequently create a temporary file(s), and it is unnecessary to generate and store information for backup of the temporary file(s). Further, when there is a storage space of which backup is determined to be unnecessary by a user, it is unnecessary to backup the storage space. Although the earlier inventions do not deal with these issues, these are very important in auxiliary storage devices to which the technology of the earlier inventions is used or similar auxiliary storage devices. In particular, when a solid-state drive (SSD) is used as an auxiliary storage device in a laptop or the like or when a large capacity server has an auxiliary storage device with large capacity, the cost can be remarkably reduced with a technology for efficiently managing the storage space of a backup auxiliary storage device because the price of an auxiliary storage device notably varies depending on capacity.

DISCLOSURE

Technical Problem

It is an object of the present invention to overcome the disadvantages of a conventional recovery schemes of a computer auxiliary storage device designed to include a backup auxiliary storage device, and to propose a device that may efficiently manage the capacity of a backup auxiliary storage device in an auxiliary storage device by determining whether to make a backup according to analysis or by deleting backed-up information.

Technical Solution

If a function of selectively generating and storing backup information is given to the conventional auxiliary storage devices, the capacity of a backup auxiliary storage device may be reduced, which will be a great advantage in terms of price. However, in order to selectively generate backup information, it is necessary to analyze access information that is transmitted when a host computer accesses an auxiliary storage device. For example, when an operating system (OS) deletes a temporary file and is creating a new temporary file, it is unnecessary to backup information related to the deleted temporary file. However, any function for determining this is not realized in existing auxiliary storage devices. This will be described in detail below.

In general, an auxiliary storage device performs a reading or writing operation, using access information received from a host computer. In this case, the host computer specifies the address of a data area to be accessed mainly with cylinder head sector (CHS) addressing or logical block addressing (LBA) rather than a file name or folder name such that the data area is accessed.

As a result, in one way or another, an address for directly or indirectly specifying a specific area of a storage space, such as a cluster number, head number, sector number, etc. is used. This is because a file system of the host computer is managed not by the auxiliary storage device but by the host computer. Of the matter of course, some of auxiliary storage devices may transmit and receive information in file units by using a separate protocol, but products, such as a hard disk drive (HDD) and a solid-state drive (SSD), widely used in desktop personal computers (PCs) or laptops generally access an auxiliary storage device by using a method of directly providing an address.

In this case, however, access information being transmitted generally does not have information, such as a file name or a file path, in practice. Accordingly, to determine whether a file system object, such as a file, a directory, or a master boot record (MBR), is accessed, the auxiliary storage device is required to analyze access information. However, the existing general auxiliary storage devices do not require such an operation. When such an operation is performed, the processing speed of the auxiliary storage device is slowed down, and there is no benefit.

On the other hand, an auxiliary storage device according to the present invention performs such an operation, and therefore, although the processing speed is slightly slowed down, the storage space of recovery information can be very efficiently managed, thereby the manufacturing cost being remarkably reduced and being possible to provide a user with backing up only a file or directory that the user wants. What is more, if a task that takes a great deal of time is processed as a background job, the slowdown in the processing speed can be prevented, which becomes more efficient job.

According to one aspect of an auxiliary storage device, which is a configuration for a host computer to access the auxiliary storage device, of the present invention, the auxiliary storage device includes: an original auxiliary storage device; a backup auxiliary storage device configured to store recovery information of the original auxiliary storage device; a user input device configured to receive a user input or the like for switching between a normal mode and a backup mode; and a controller connected to the original auxiliary storage device, the backup auxiliary storage device, and the user input device and configured to control the auxiliary storage device in the normal mode and the backup mode, or to manage the recovery information in response to a user command.

The normal mode and the backup mode controlled by the controller may be selected by a user through the user input device. In the normal mode, the controller controls the auxiliary storage device so that the host computer is booted using an OS of the original auxiliary storage device and the backup auxiliary storage device is unable to be accessed. In the backup mode, the controller controls the auxiliary storage device so that the host computer is booted using a duplicated copy of an OS stored in the backup auxiliary storage device or an OS separately provided by the auxiliary storage device, and recovers the original auxiliary storage device on the basis of the recovery information recorded in the backup auxiliary storage device.

The controller may be implemented as software and related hardware, which is responsible for functional computation of a central processing unit (CPU) controlling the auxiliary storage device. As in the earlier inventions, the controller may be connected to the original auxiliary storage device, the backup auxiliary storage device, and the user input device in various forms, and the user input device may be implemented as an electrical switch that is operated by the user. On the other hand, the user input device may be configured as a communication module to confirm a single user input or a plurality of user inputs on the basis of information received in a wired or wireless manner.

In one embodiment of the invention, the controller may include a recovery information management module configured to manage whether to generate and store the recovery information of the original auxiliary storage device.

Here, the recovery information management module may include an access information analysis unit configured to analyze access information provided by the host computer to access the original auxiliary storage device; a file system object identification unit configured to identify a file system object which is using a storage space of an access address included in the access information; and a recovery information recording unit configured to generate and record recovery information about the storage space of the access address when the identified file system object is a recovery-required object specified by the user.

Meanwhile, as another embodiment, the recovery information management module may include an access information analysis unit configured to analyze access information provided by the host computer to access the original auxiliary storage device; a file system object identification unit configured to identify a file system object which is using a storage space of an access address included in the access information by comparing the file system object with a lookup table obtained by analyzing a file system of the host computer and containing sector or cluster information assigned to files or directories; and a recovery information recording unit configured to generate and record recovery information about the storage space of the access address when the identified file system object is a recovery-required object specified by the user.

In another embodiment of the invention, the controller may include a recovery information deletion module configured to delete the previously stored recovery information of the original auxiliary storage device.

The recovery information deletion module may include a recovery information analysis unit configured to extract an access address of the recovery information previously stored in the backup auxiliary storage device; a file system object identification unit configured to identify a file system object which uses the access address included in the recovery information; and a recovery information deletion unit configured to delete the previously stored recovery information when the identified file system object is a non-recovery-required object specified by the user.

According to another aspect of an auxiliary storage device, the auxiliary storage device includes a display device in addition to the configuration of the auxiliary storage device according to the previously explained one. The display device may be configured as a light-emitting diode (LED), a display, an alarm device, or the like. According to another embodiment, the display device may be configured as a communication module like the user input device to confirm a user input on the basis of information received in a wired or wireless manner. Otherwise, the user input device and the display device may be integrated as a single I/O (input/output) device.

The controller of the auxiliary storage device according to the other aspect may additionally include a user command input module configured to receive a user command from the user input device; a display device driving module configured to drive the display device; and a recovery information maintenance module configured to delete or compress recovery information according to the received user command.

The recovery information maintenance module may include a recovery information analysis unit configured to extract an access address by analyzing recovery information stored in advance in the backup auxiliary storage device; a file system object identification unit configured to identify a file system object which is using a storage space of the access address; and a recovery information deletion unit configured to determine whether the identified file system object is a file system object specified as a target to be deleted in the user command and delete the recovery information when the identified file system object is the file system object specified as the target to be deleted.

Meanwhile, as another embodiment, the recovery information maintenance module may include a recovery information analysis unit configured to extract an access address by analyzing recovery information stored in advance in the backup auxiliary storage device; a file system object identification unit configured to identify a file system object which is using a storage space of the access address; and a recovery information compression unit configured to determine whether the identified file system object is a file system object specified as a target to be compressed in the user command and compress the recovery information when the identified file system object is the file system object specified as the target to be compressed.

The recovery information maintenance modules of the two embodiments may include a user command analysis unit configured to analyze the user command and a maintenance algorithm execution unit configured to perform a function of deleting, compressing, transmitting, etc. the recovery information stored in advance in the backup auxiliary storage device according to a pre-set algorithm corresponding to the analyzed user command. The recovery information maintenance modules of the two embodiments may additionally include an information display unit configured to display information on the display device for providing information generated in a process of performing the above operations, additional input of the user, and the like.

According to yet another aspect of the present invention, there is provided a method of managing recovery information that executes or implements a device for managing recovery information about the above-described auxiliary storage device as a methodological means.

According to still yet another aspect of the present invention, there is provided application devices, such as a personal computer (PC), a server computer, a mobile phone, and an automatic controller, to which the device and/or method for managing recovery information about the above-described auxiliary storage device is applied.

The comprehensive configuration of the present invention introduced above will become more apparent through specific embodiments described below with reference to drawings.

Advantageous Effects

An auxiliary storage device including an original auxiliary storage device and a backup auxiliary storage device according to the present invention effectively uses the capacity of the backup auxiliary storage device by managing recovery information. Accordingly, a storage area required for backup is remarkably reduced compared to products to which the technology according to the present invention is not applied, such that the production cost can be notably reduced. For example, laptops or tablet computers usually employ a solid-state drive (SSD) as an auxiliary storage device to reduce the weight for the convenience of portability in spite of the high price, and high-capacity servers employ very high-capacity auxiliary storage devices. Here, when the technology according to the present invention is applied, it is possible to install auxiliary storage devices that can recover data damage caused by malicious software, without a large amount of cost, which has both commercial and social significance.

More specifically, the auxiliary storage device according to the present invention can very efficiently manage the storage space of recovery information. Accordingly, the manufacturing cost can be remarkably reduced, and a user can be provided with a means for backing up only files or directories wanted by himself or herself. Further, when a time-consuming task is processed as a background job, a slowdown in the processing speed can be prevented, which is considered as more efficient.

BEST MODE OF THE INVENTION

Figure 1:
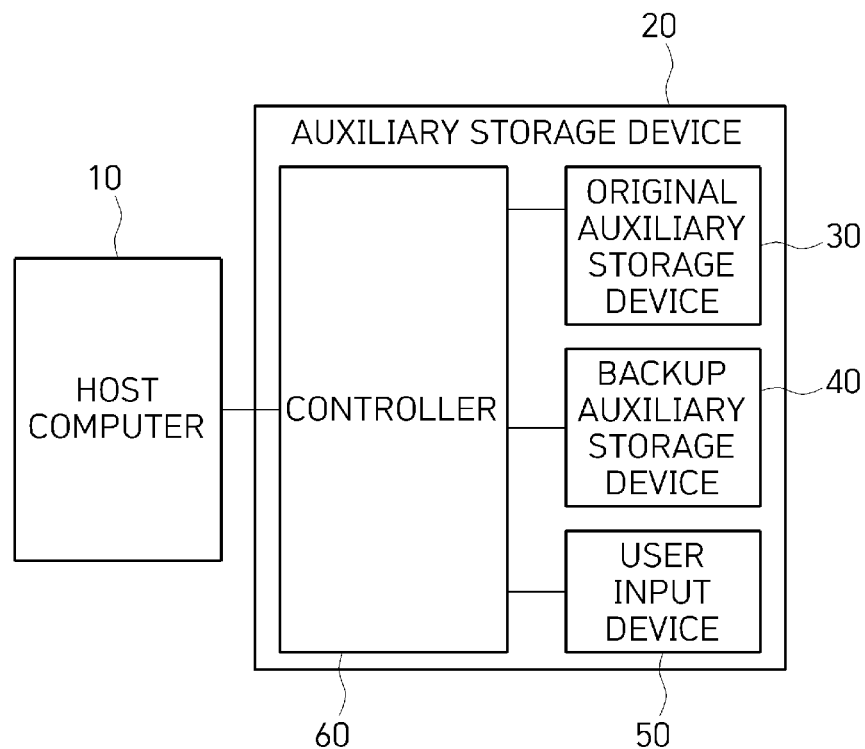
FIG. 1 is a schematic diagram of an auxiliary storage device (20) according to one embodiment of the present invention.

The advantages and features of the present invention and methods of achieving them will become more apparent through embodiments described in detail with reference to the accompanying drawings. However, the present invention is not limited to the embodiments set forth herein and can be implemented in various different forms. The embodiments are merely provided to make the disclosure of the present invention complete and fully convey the scope of the present invention to those skilled in the technical field to which the present invention pertains. The technical scope of the present invention is defined by the claims.

Meanwhile, terminology used in this specification is for describing the embodiments and is not intended to limit the present invention. In this specification, the singular also includes the plural unless specifically described in the context. As used herein, the terms "comprise" and "comprising" do not exclude the presence or addition of one or more elements, steps, operations, and/or devices other than stated elements, steps, operations, and/or devices.

Hereinafter, exemplary embodiments of the present invention will be described in detail with reference to the accompanying drawings. In giving reference numerals to elements of each drawing, like numerals are given to like elements, if possible, even when the like elements are shown in different drawings. In describing the present invention, detailed descriptions of well-known relevant elements or functions will be omitted when the detailed descriptions may obscure the gist of the present invention.

FIG. 1 is a schematic diagram of an auxiliary storage device 20 according to one embodiment of the present invention. In the configuration, basically a host computer 10 accesses the auxiliary storage device 20.

The auxiliary storage device 20 includes an original auxiliary storage device 30, a backup auxiliary storage device 40, and a user input device 50. The original auxiliary storage device 30, the backup auxiliary storage device 40, and the user input device 50 are controlled by a controller 60.

The backup auxiliary storage device 40 stores recovery information about the original auxiliary storage device 30.

The user input device 50 receives commands of a user. For example, the user input device 50 is used to provide a user input for switching between a normal mode and a backup mode, a command for recovery information maintenance, etc. to the controller 60. The user input device 50 may be configured as an electrical switch, such as a mode selection switch, or configured as a communication module to confirm a user input on the basis of information received in a wired or wireless manner. It is preferable that the communication protocol is used in an encrypted manner to strengthen security.

The controller 60 is generally implemented as software which is responsible for computation of a central processing unit (CPU) for controlling the auxiliary storage device 20, and its related hardware. However, for high-speed processing, a part of the controller 60 that manages the access passage of the original auxiliary storage device may also be implemented as hardware employing a field programmable gate array (FPGA). When a mode selected by the user is the normal mode, the controller 60 controls the auxiliary storage device 20, so that the host computer 10 is booted using an operating system (OS) of the original auxiliary storage device 30 and the backup auxiliary storage device 40 is unable to be accessed. Also, when the user selects the backup mode, the controller 60 controls the auxiliary storage device 20, so that the host computer 10 is booted using a duplicated copy of an OS stored in the backup auxiliary storage device 40 or an OS separately provided by the auxiliary storage device 20, and performs an operation related to recovery of the original auxiliary storage device 30 on the basis of the recovery information recorded in the backup auxiliary storage device 40.

Such a configuration and functions fundamentally differ from that of existing auxiliary storage devices on the market. Even when the host computer 10 destroys the original auxiliary storage device 30 due to the intrusion of a malicious program, the auxiliary storage device 20 having the above configuration can be recovered at all times with backup information stored in the backup auxiliary storage device 40 that is physically and completely blocked. In addition to such advantages, the present invention provides additional configuration that makes it possible to efficiently reduce the amount of backup information by selectively managing backup information.

Figure 7:
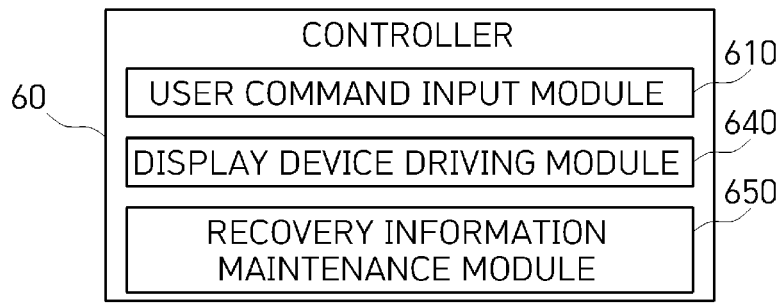
FIG. 7 is a configuration diagram of a controller (60) of the auxiliary storage device (20) of FIG. 6.

The original auxiliary storage device 30 and the backup auxiliary storage device 40 of FIG. 1 may employ a general commercial hard disk drive (HDD) or solid-state drive (SSD) and may be directly implemented as a non-volatile memory. The controller 60 is configured as shown in FIG. 2 or FIG. 7.

Figure 2:
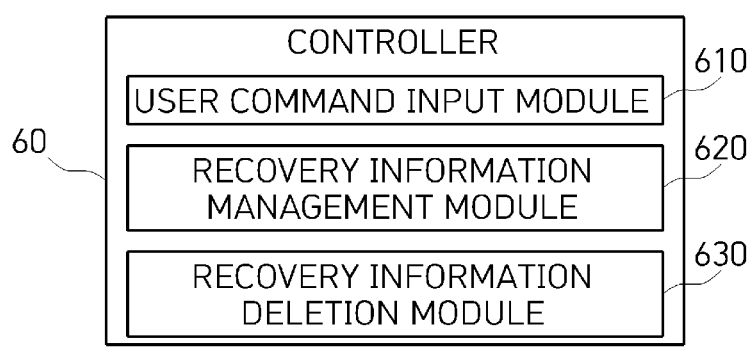
FIG. 2 is a configuration diagram of a controller (60) of the auxiliary storage device (20) of FIG. 1.

FIG. 2 is a configuration diagram of the controller 60 of the auxiliary storage device 20 of FIG. 1.

The controller 60 includes a user command input module 610 that receives a command from the user input device 50, a recovery information management module 620 that manages recovery information in the backup auxiliary storage device 40, and a recovery information deletion module 630 that deletes the stored recovery information. These modules are easily implemented as software in the controller 60, but some of the modules may be implemented as hardware to increase the processing speed.

Figure 3:
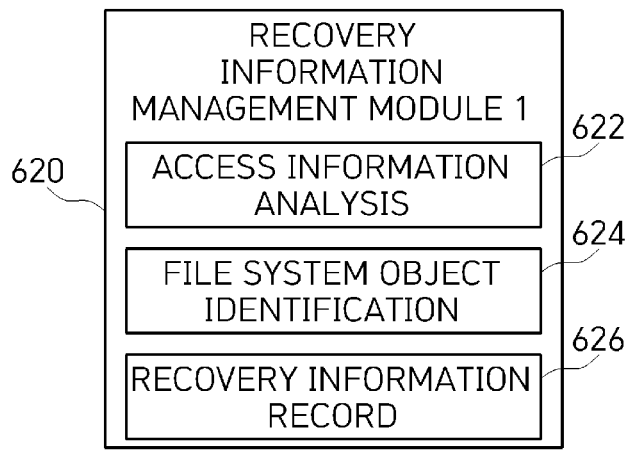
FIG. 3 is a configuration diagram of a recovery information management module (620) of the controller (60) shown in FIG. 2 according to an embodiment.

FIG. 3 is a configuration diagram of a recovery information management module 620 in the controller 60 shown in FIG. 2 according to an embodiment.

The recovery information management module 620 according to the embodiment of FIG. 3 includes an access information analysis unit 622 that analyzes access information provided by the host computer 10 to access the original auxiliary storage device 30; a file system object identification unit 624 that identifies a file system object which is using the storage space of an access address included in the access information; and a recovery information recording unit 626 that generates and records recovery information about the storage space of the access address when the identified file system object is a recovery-required object specified by the user. Each of the units is easily created as a software module and executed by the controller 60, but when each of the units is implemented as hardware as in a lifespan management method for non-volatile memories (NVMs), such as a flash memory, high-speed processing is possible.

The access information may include an access time, an access address represented by cylinder head sector (CHS) addressing, logical block addressing (LBA), or the like, and a type of operation command of the host, such as write and read, in the case of access for data storage; and may include write data and the like in the case of a write operation. These pieces of information may be sequentially transmitted or may be transmitted in the form of block data at a time according to a protocol used for communication by the host computer 10 and the auxiliary storage device. Also, recovery information may include the access time, the access address, the type of operation command, and data stored in advance in a storage space specified by the access address.

For example, it is assumed that a host computer having a new technology file system (NTFS) issues a command to write new data DATA_NEW in sector A in which existing information DATA_OLD is stored to an auxiliary storage device. An existing commercial auxiliary storage device without a backup function directly writes DATA_NEW in sector A without an operation of moving or managing the existing information of sector A. Then, DATA_OLD disappears and is impossible to be recovered. On the other hand, since the auxiliary storage device of the present invention has a backup function, and thus, when sector A is a space used by a recovery-required object, it generates and selectively stores recovery information about sector A in the backup auxiliary storage device 40.

Meanwhile, recovery information about sector A may be generated as follows and stored in the backup auxiliary storage device 40. The recovery information cannot be accessed by the host computer 10 in the normal mode and thus cannot be deleted by malicious software.

Configuration Example 1 of Recovery Information

Access time: 2018-12-31 17:00:00
Physical address: sector A
Stored data: DATA_OLD The stored data may also be DATA_NEW depending on storage methods. However, in this embodiment, it is assumed that the existing information previously stored in sector A is the stored data. In this way, recovery information is generated and recorded in the backup auxiliary storage device 40, and DATA_NEW is written in sector A of the original auxiliary storage device 30. Therefore, DATA_OLD is retained and can be recovered later.

Meanwhile, in the auxiliary storage device according to the present invention, the recovery information management module 620 is responsible for such a recovery information composition operation. In the recovery information management module 620, the access information analysis unit 622 analyzes that the access is for the access address sector A, and the file system object identification unit 624 identifies a file system object which is using the storage space of the access address to detect the file system object which uses sector A.

For reference, a file system object basically means an element constituting a file system or a combination of the elements. Accordingly, file system objects may be sectors, clusters, file paths, filenames, directories, partitions, or a drive itself, or the combination of them. Therefore, a master boot record (MBR), a partition boot record (PBR), or a master file table (MFT) in the case of NTFS and a file allocation table (FAT) in the case of FAT file system may also be file system objects. Consequently, a file system object may be a storage space, such as a sector or a cluster, specified by CHS addressing or LBA; a specific file, such as c:/user/documents/korea.doc; files of a directory and the whole directory, such as /temporary, denoting temporary use; a partition or a drive, such as drive D:; or a cluster, such as an MBR.

An operation of identifying a file system object with information "sector A" takes a great deal of time because of backtracking. However, if a lookup table is prepared in advance from sector/cluster allocation information of the NTFS, the time can be remarkably reduced. Also, the real-time performance of the operation may be omitted, and after general recovery information is generated and unconditionally recorded, the recovery information deletion module may be run as a background job such that the processing time is reduced. This will be described in detail below. When file system object information is included, the recovery information can be configured as follows.

Configuration Example 2 of Recovery Information

Access time: 2018-12-31 17:00:00
Physical address: sector A, File system information: c:/User/Korea.doc
Area information: 22334455 . . . (512 bytes)

Subsequently, when the identified file system object is a recovery-required object specified by the user, the recovery information management module 620 generates recovery information about sector A as shown in the configuration examples of recovery information and performs an operation of recording recovery information in the backup auxiliary storage device 40.

In other words, auxiliary storage devices according to the present invention generate and store recovery information about only a recovery-required object specified as being required for recovery, and thus the storage space of the backup auxiliary storage device 40 can be remarkably reduced (unlike this, the auxiliary storage devices according to the earlier inventions neither generate nor manage this information).

A recovery-required object and a non-recovery-required object can be specified by providing a means, such as an initialization program, to the user. For example, the user may specify and manage a boot partition (drive) C: as a non-recovery-required object, and specify and manage a user partition (drive) D: as a recovery-required object. In this case, since system programs and OS are contained in the boot partition, the auxiliary storage device generates and records recovery information about only user files.

A closer look clearly reveals advantages of the present invention. For example, in the case of Windows OS, the system file PAGEFILE.SYS is a file used as a disk cache, and the OS frequently accesses the file to temporarily store information. Also, application programs create files from a number of pieces of data including log information in the directory C:/Windows/Temp and frequently access the files. In addition, for a self-recovery function, Windows OS may generate and store recovery information in the directory/ System Volume Information every time the system configuration is changed.

Here, it is unnecessary to back up files that are temporarily created or removed while the OS is running. In the above example, when file system objects which are using sector A are PAGAFILE.SYS and files of/temp, backup is unnecessary. Also, past information of/System Volume Information has no significance, and it is not necessary to recover the past information at all.

In the present invention, sectors, clusters, files, directories, partitions, or drives of which recovery information is not required to be managed can be specified and managed as non-recovery-required objects by the user as described above. In other words, if sector A is a non-recovery-required object or may belong to a non-recovery-required object file, directory, or the like, when a write command for sector A is received from the host computer 10, it is possible to omit a procedure for generating recovery information by immediately determining whether sector A is an object that does not require recovery through the file system object identification unit 624. Also, after recovery information is generated and recorded first, it may be determined whether the corresponding file system object is a non-recovery-required object through a background program, and the corresponding information may be deleted. Accordingly, the backup auxiliary storage device 40 can be efficiently managed.

Figure 4:
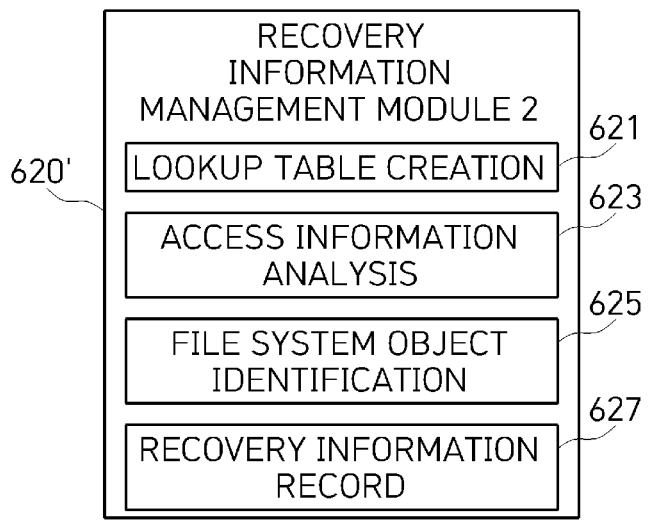
FIG. 4 is a configuration diagram of a recovery information management module (620') of the controller (60) shown in FIG. 2 according to another embodiment.

FIG. 4 is a configuration diagram of a recovery information management module 620' in the controller 60 shown in FIG. 2 according to another embodiment. This embodiment is for reducing time by preparing a lookup table from sector/cluster allocation information of the NTFS in advance as described above so that a filename and a file path are easily obtained with sector/cluster information.

The recovery information management module 620' according to this embodiment includes a lookup table creation unit 621 that analyzes the file system of the host computer 10 and creates a table from sector or cluster information assigned to files, directories, or the like; an access information analysis unit 623 that analyzes access information provided by the host computer 10 to access the original auxiliary storage device; a file system object identification unit 625 that identifies a file system object which is using the storage space of an access address included in the access information by comparing the file system object with the lookup table; and a recovery information recording unit 627 that generates and records recovery information about the storage space of the access address when the identified file system object is a recovery-required object specified by the user. In some cases, it is necessary to only use a lookup table created in advance, and thus the lookup table creation unit 621 may not have a creation function. However, since a lookup table represents the current status of the file system at all times, the lookup table creation unit 621 may be responsible for a function of reflecting a change in the file system which has not been reflected.

The recovery information management module 620' is easily implemented as software and run by the controller, but if the recovery information management module 620' is implemented as hardware as in a management method for NVMs, such as a flash memory, high-speed processing is possible.

The lookup table creation unit 621 is required in a file system such as the NTFS of Windows. The NTFS fundamentally employs an MFT which shows various attributes of files and directories and data locations thereof. Here, the MFT shows pieces of information as entries, and thus it is difficult to intuitively know the location of a file or directory compared to a FAT.

Therefore, to reduce the time taken by the file system object identification unit 625, it is preferable to obtain sector/cluster information, such as the occupation of sectors or clusters, by analyzing the MFT of the NTFS and easily determine a filename and file path or to create a lookup table in the form of a FAT. While the MFT manages the occupation of clusters or sectors in the form of connected data, the lookup table manages the occupation of clusters or sectors as a simple table, and thus it is possible to determine an object faster than in a case in which there is no lookup table.

However, such an operation of detecting actual areas of a disk occupied by files or directories and creating a lookup table from the detections takes a great deal of time to be performed every time. Therefore, in the case of booting or system initialization, it is preferable to scan the entire storage area, to create a lookup table at a time, and to manage the lookup table. Also, a lookup table may be changed for management every time a file, directory, or the like is newly created or deleted. Even a file system, such as the hierarchical file system (HFS) of Mac, requires such a method to reduce a determination time.

Figure 5:
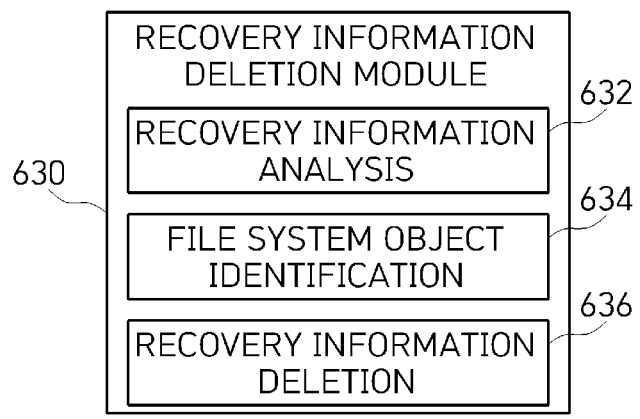
FIG. 5 is a configuration diagram of a recovery information deletion module (630) of the controller (60) shown in FIG. 2.

FIG. 5 is a configuration diagram of the recovery information deletion module 630 of the controller 60 shown in FIG. 2. The recovery information deletion module 630 includes a recovery information analysis unit 632 that extracts an access address of the recovery information previously stored in the backup auxiliary storage device 40; a file system object identification unit 634 that identifies a file system object which uses the access address included in the recovery information; and a recovery information deletion unit 636 that deletes the previously stored recovery information when the identified file system object is a non-recovery-required object specified by the user. The file system object identification unit 634 may use the lookup table during an object identification operation.

The auxiliary storage devices of the earlier inventions basically generate and store recovery information for all accesses containing a write operation command of the host computer 10. After the recovery information is stored, the technology of the present invention may be applied by selectively deleting the stored recovery information through the object identification operation according to the present invention. In this case, the recovery information deletion module 630 may be run as a background job. For example, it is assumed that the recovery information deletion module 630 is run as a background job. The recovery information deletion module 630 extracts access addresses by sequentially checking recovery information, identifies whether the corresponding file system objects are non-recovery-required objects by comparing the extracted access addresses with the lookup table, and then deletes the access addresses when the corresponding file system objects are non-recovery-required objects such that the storage space of the backup auxiliary storage device 40 can be prevented from being wasted.

Figure 6:
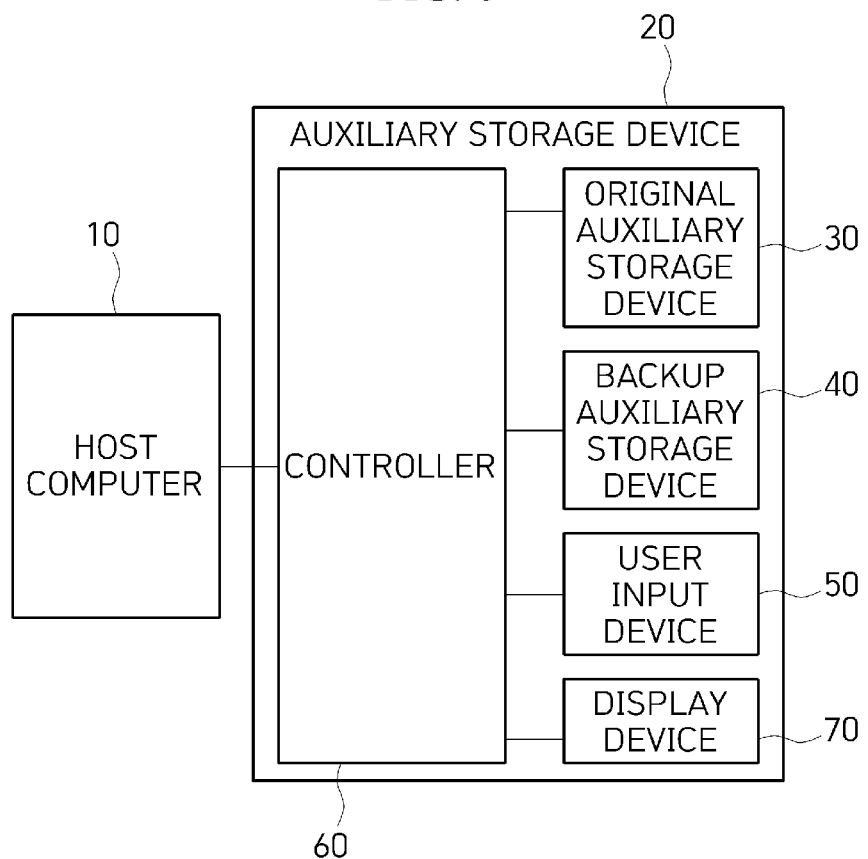
FIG. 6 is a schematic diagram of an auxiliary storage device (20) according to another embodiment of the present invention.

FIG. 6 is a schematic diagram of an auxiliary storage device 20 according to another embodiment of the present invention. In this embodiment, a display device 70 is additionally included in the auxiliary storage device 20 of FIG. 1.

The display device 70 is generally configured as a light-emitting diode (LED), a display, an alarm device, or the like. However, the display device 70 may be configured as a communication module like the user input device 50 to confirm a user input on the basis of information received in a wired or wireless manner. Otherwise, the user input device 50 and the display device 70 may be integrated as a single I/O device.

FIG. 7 is a configuration diagram of a controller 60 of the auxiliary storage device 20 of FIG. 6. The controller 60 includes a user command input module 610; a display device driving module 640 that drives the display device 70; and a recovery information maintenance module 650 that deletes or compresses recovery information according to an input user command. The recovery information maintenance module 650 will be described below.

Figure 8:
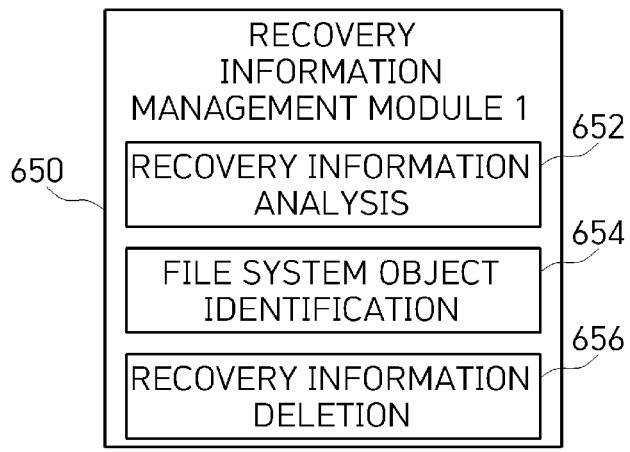
FIG. 8 is a configuration diagram of a recovery information maintenance module (650) of FIG. 7.

FIG. 8 is a configuration diagram of the recovery information maintenance module 650 of FIG. 7 according to one embodiment. The recovery information maintenance module 650 includes a recovery information analysis unit 652 that extracts an access address of the recovery information previously stored in the backup auxiliary storage device 40; a file system object identification unit 654 that identifies a file system object which is using the storage device of the access address; and a recovery information deletion unit 656 that deletes the previously stored recovery information when the identified file system object is a non-recovery-required object specified by the user. The file system object identification unit 654 may use the lookup table during an object identification operation.

Figure 9:
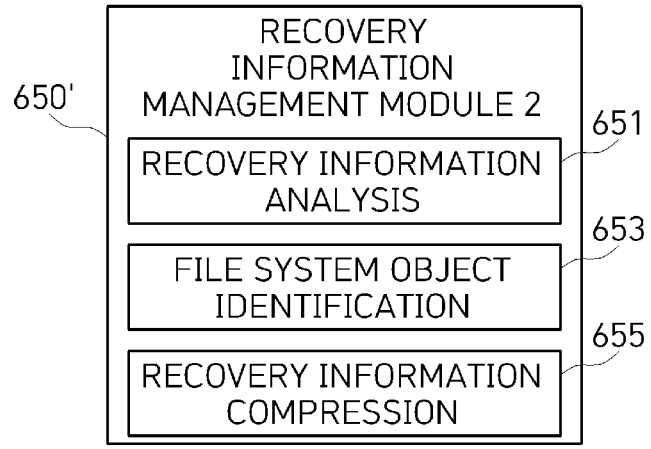
FIG. 9 is a configuration diagram of a recovery information maintenance module (650') according to another embodiment.

FIG. 9 is a configuration diagram of the recovery information maintenance module 650 of FIG. 7 according to another embodiment. This recovery information maintenance module 650' includes a recovery information analysis unit 651 that extracts an access address of the recovery information previously stored in the backup auxiliary storage device 40; a file system object identification unit 653 that identifies a file system object which is using the storage device of the access address; and a recovery information deletion unit 655 that deletes the previously stored recovery information when the identified file system object is a non-recovery-required object specified by the user. The file system object identification unit 653 may use the lookup table during an object identification operation.

Figure 10:
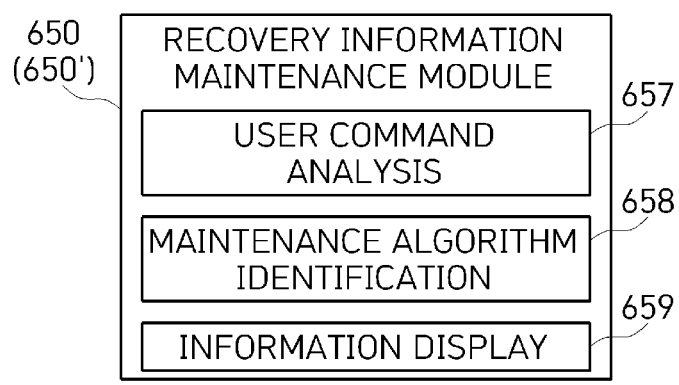
FIG. 10 is a diagram of elements additionally included in the recovery information maintenance module (650 or 650').

FIG. 10 shows elements that may be additionally included in the recovery information maintenance module 650 or 650' of FIG. 8 or 9. In addition to the elements of the recovery information maintenance module 650 or 650', a user command analysis unit 657 that analyzes a user command and a maintenance algorithm execution unit 658 that deletes or compresses the recovery information previously stored in the backup auxiliary storage device according to a previously stored algorithm specified by the analyzed user command may be included. Also, when the recovery information maintenance module 650 or 650' is configured as FIG. 10, an information display unit 659 that displays information on the display device 70 of FIG. 6 may be optionally included for information provision, user's additional input, etc. occurring in performing the above operations.

Meanwhile, the recovery information management modules 620 and 620', the recovery information deletion module 630, the recovery information maintenance modules 650 and 650', and the maintenance algorithm execution unit 658 described above can be manufactured as separate hardware or a single chip. Also, only a partial function of each of the modules, for example, a function of identifying a file system object through the lookup table which is a function of the file system object identification unit 625, may be separated and manufactured as hardware or a single chip. The integrated recovery information management chip may be implemented to execute a program code, in which a recovery information management function, a recovery information deletion function, a recovery information maintenance function, a maintenance algorithm execution function, or the like is implemented, with an independent memory, a CPU interface circuit, a high-speed computation circuit, and the like. In particular, if the operation of compressing or decompressing information is performed in hardware architecture, it can be processed at high speed, thereby being a great advantage.

Meanwhile, only the function of identifying a file system object through the lookup table, which is a function of the file system object identification unit 625, may be separated and implemented as a search-only chip with an FPGA and a computational core. In this case, the search-only chip may be formed of a computational core, which is equipped with a CPU interface circuit, a memory interface circuit for independently accessing a shared memory, a dedicated memory, or a CPU memory, and a search engine, and may perform an operation of identifying a file system object using sector or cluster information on the basis of the lookup table.

The present invention provides application devices, such as a personal computer (PC), a server computer, a mobile phone, and an automatic controller, to which the above-described device and/or method of managing recovery information about an auxiliary storage device according to the present invention are applied.

Although the configurations of the present invention have been described in detail with reference to the exemplary embodiments of the present invention, those of ordinary skill in the art should appreciate that the present invention can be implemented in a specific form different from the disclosure herein without changing the technical spirit or essential characteristics of the present invention. The above-described embodiments should be considered in all aspects as illustrative and not restrictive. The scope of the present invention is determined by the claims rather than the above detailed descriptions, and all modifications or alterations derived from the claims and the equivalents should be construed as falling within the scope of the present invention.

The invention claimed is:

1. An auxiliary storage device comprising:
an original auxiliary storage device;
a backup auxiliary storage device configured to store recovery information of the original auxiliary storage device;
a user input device configured to receive a user input for switching between a normal mode and a backup mode; and
a controller connected to the original auxiliary storage device, the backup auxiliary storage device, and the user input device, and configured to control the original and the backup auxiliary storage devices in the normal mode and the backup mode and to manage the recovery information according to a user command,
wherein the controller is connected to a host computer located outside the auxiliary storage device, and in the normal mode, controls the original and the backup auxiliary storage devices independently from the host computer by allowing the host computer to access an operating system (OS) of the original auxiliary storage device and preventing the host computer from accessing the backup auxiliary storage device, based on a user command for activating the normal mode being directly provided to the controller of the auxiliary storage device via the user input device,
wherein the controller controls the original and the backup auxiliary storage devices in the backup mode independently from the host computer by allowing the host computer to access a duplicated copy of an OS stored in the backup auxiliary storage device or an OS separately provided by the auxiliary storage device, and recovering the original auxiliary storage device on the basis of the recovery information recorded in the backup auxiliary storage device, based on a user command for activating the backup mode being directly provided to the controller of the auxiliary storage device via the user input device, and
wherein the controller comprises a recovery information management module configured to manage whether to generate and store the recovery information of the original auxiliary storage device, the recovery information management module comprising:
an access information analysis unit configured to analyze access information provided by the host computer to access the original auxiliary storage device;
a file system object identification unit configured to identify a file system object which is using a storage space of an access address included in the access information; and
a recovery information recording unit configured to generate and record recovery information about the storage space of the access address when the identified file system object is a recovery-required object specified by a user.

2. The auxiliary storage device of claim 1, wherein the file system object identification unit of the recovery information management module is further configured to identify a file system object which is using a storage space of an access address included in the access information by comparing the file system object with a lookup table obtained by analyzing a file system of the host computer and containing sector or cluster information assigned to files or directories.

3. The auxiliary storage device of claim 1, wherein the controller further comprises a recovery information deletion module configured to delete the previously stored recovery information of the original auxiliary storage device,
wherein the recovery information deletion module comprises:
a recovery information analysis unit configured to extract an access address of the recovery information previously stored in the backup auxiliary storage device;
a file system object identification unit configured to identify a file system object which uses the access address included in the recovery information by analyzing the access address; and
a recovery information deletion unit configured to delete the previously stored recovery information when the identified file system object is a non-recovery-required object specified by a user.

4. The auxiliary storage device of claim 1, further comprising a display device configured to display a result of a control operation of the controller,
wherein the controller comprises:
a user command input module configured to receive the user command from the user input device;
a display device driving module configured to drive the display device; and
a recovery information maintenance module configured to delete or compress the recovery information according to the received user command.

5. The auxiliary storage device of claim 4, wherein the recovery information maintenance module comprises:
a recovery information analysis unit configured to extract an access address by analyzing the recovery information previously stored in the backup auxiliary storage device;
a file system object identification unit configured to identify a file system object which is using a storage space of the access address; and
a recovery information deletion unit configured to determine whether the identified file system object is a file system object specified as a target to be deleted by the user command and delete the recovery information when the identified file system object is the target to be deleted.

6. The auxiliary storage device of claim 4, wherein the recovery information maintenance module comprises:
a recovery information analysis unit configured to extract an access address by analyzing the recovery information previously stored in the backup auxiliary storage device;
a file system object identification unit configured to identify a file system object which is using a storage space of the access address; and
a recovery information compression unit configured to determine whether the identified file system object is a file system object specified as a target to be compressed by the user command and compress the recovery information when the identified file system object is the target to be compressed.

7. The auxiliary storage device of claim 5, wherein the recovery information maintenance module further comprises:
a user command analysis unit configured to analyze the user command; and
a maintenance algorithm execution unit configured to perform a function of deleting, compressing, or transmitting the recovery information previously stored in the backup auxiliary storage device according to a previously stored algorithm specified by the analyzed user command.

8. The auxiliary storage device of claim 6, wherein the recovery information maintenance module further comprises:
a user command analysis unit configured to analyze the user command; and
a maintenance algorithm execution unit configured to perform a function of deleting, compressing, or transmitting the recovery information previously stored in the backup auxiliary storage device according to a previously stored algorithm specified by the analyzed user command.

9. A method of managing recovery information performed in an auxiliary storage device, which includes an original auxiliary storage device, a backup auxiliary storage device configured to store recovery information of the original auxiliary storage device, a user input device configured to receive a user input for switching between a normal mode and a backup mode, and a controller connected to a host computer, the original auxiliary storage device, the backup auxiliary storage device, and the user input device and configured to control the auxiliary storage device in the normal mode and the backup mode and to manage the recovery information according to a user command,
the method comprising:
providing a user command to activate the normal mode directly to the controller of the auxiliary storage device via the user input device, and in the normal mode, controlling the original and the backup auxiliary storage devices independently from the host computer located outside the auxiliary storage device by allowing the host computer to access an operating system (OS) of the original auxiliary storage device and preventing the host computer from accessing the backup auxiliary storage device;
providing a user command to activate the backup mode directly to the controller of the auxiliary storage device via the user input device, and in the backup mode, controlling the original and the backup auxiliary storage devices independently from the host computer by allowing the host computer to access a duplicated copy of an OS stored in the backup auxiliary storage device or an OS separately provided by the auxiliary storage device and recovering the original auxiliary storage device on the basis of the recovery information stored in the backup auxiliary storage device; and
generating and storing the recovery information of the original auxiliary storage device when the auxiliary storage device is switched to the backup mode,
wherein the generating and storing of the recovery information comprises:
an access information analysis operation of analyzing access information provided by the host computer to access the original auxiliary memory device;
a file system object identification operation of identifying a file system object which is using a storage space of an access address included in the access information; and
a recovery information record operation of generating and recording recovery information about the storage space of the access address when the identified file system object is a recovery-required object specified by a user.

10. The method of claim 9, wherein the file system object identification operation of the managing whether to generate and store the recovery information comprises:
identifying a file system object which is using a storage space of an access address included in the access information by comparing the file system object with a lookup table obtained by analyzing a file system of the host computer and containing sector or cluster information assigned to files or directories.

11. The method of claim 9, further comprising a recovery information deletion operation of deleting the previously stored recovery information of the original auxiliary storage device,
wherein the recovery information deletion operation comprises:
a recovery information analysis operation of extracting an access address of the recovery information previously stored in the backup auxiliary storage device;
a file system object identification operation of identifying a file system object which uses an access address included in the recovery information by comparing the access address with a lookup table; and
a recovery information deletion operation of deleting the previously stored recovery information when the identified file system object is a non-recovery-required object specified by a user.

12. The method of claim 9, wherein the auxiliary storage device further includes a display device,
the method comprising:
a user command input operation of receiving a user command from the user input device;
a display device driving operation of driving the display device; and
a recovery information maintenance operation of deleting or compressing the recovery information according to the received user command.

13. The method of claim 12, wherein the recovery information maintenance operation comprises:
a recovery information analysis operation of extracting an access address by analyzing the recovery information previously stored in the backup auxiliary storage device;

a file system object identification operation of identifying a file system object which is using a storage space of the access address; and a recovery information deletion operation of determining whether the identified file system object is a file system object specified as a target to be deleted by the user command and deleting the recovery information when the identified file system object is the target to be deleted.

14. The method of claim 12, wherein the recovery information maintenance operation comprises:

a recovery information analysis unit operation of extracting an access address by analyzing the recovery information previously stored in the backup auxiliary storage device;

a file system object identification operation of identifying a file system object which is using a storage space of the access address; and a recovery information compression operation of determining whether the identified file system object is a file system object specified as a target to be compressed by the user command and compressing the recovery information when the identified file system object is the target to be compressed.

15. The method of claim 13, wherein the recovery information maintenance operation further comprises:

a user command analysis operation of analyzing the user command; and a maintenance algorithm execution operation of performing a function of deleting, compressing, or transmitting the recovery information previously stored in the backup auxiliary storage device according to a previously stored algorithm specified by the analyzed user command.

16. The method of claim 14, wherein the recovery information maintenance operation further comprises:

a user command analysis operation of analyzing the user command; and a maintenance algorithm execution operation of performing a function of deleting, compressing, or transmitting the recovery information previously stored in the backup auxiliary storage device according to a previously stored algorithm specified by the analyzed user command.

* * * * *